US011500803B2

(12) United States Patent
Ngo et al.

(10) Patent No.: US 11,500,803 B2
(45) Date of Patent: Nov. 15, 2022

(54) PROGRAMMABLE SLAVE CIRCUIT ON A COMMUNICATION BUS

(71) Applicant: Qorvo US, Inc., Greensboro, NC (US)

(72) Inventors: Christopher Truong Ngo, Queen Creek, AZ (US); Nadim Khlat, Cugnaux (FR); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 44 days.

(21) Appl. No.: 17/009,064

(22) Filed: Sep. 1, 2020

(65) Prior Publication Data
US 2021/0064557 A1 Mar. 4, 2021

Related U.S. Application Data

(60) Provisional application No. 62/895,064, filed on Sep. 3, 2019.

(51) Int. Cl.
*G06F 13/364* (2006.01)
*G06F 13/42* (2006.01)
(Continued)

(52) U.S. Cl.
CPC .......... *G06F 13/364* (2013.01); *G06F 7/575* (2013.01); *G06F 9/30029* (2013.01);
(Continued)

(58) Field of Classification Search
None
See application file for complete search history.

(56) References Cited

U.S. PATENT DOCUMENTS 5,621,913 A * 4/1997 Tuttle ................ H04L 29/12254
327/564
5,754,948 A * 5/1998 Metze ..................... H04B 7/00
455/67.11
(Continued)

OTHER PUBLICATIONS

'The BlueNRG-1, BlueNRG-2 BLE OTA (over-the-air) firmware upgrade' Application Note AN4869, STMicroelectronics, Nov. 2018. (Year: 2018).*
(Continued)

*Primary Examiner* — Steven G Snyder
(74) *Attorney, Agent, or Firm* — Withrow & Terranova, P.L.L.C.

(57) ABSTRACT

A programmable slave circuit on a communication bus is provided. In a non-limiting example, the communication bus can be a radio frequency front-end (RFFE) bus operating based on a master-slave topology and the programmable slave circuit can be an RFFE slave circuit on the RFFE bus. The programmable slave circuit is configured to receive a high-level command(s) (e.g., a macro word) over the communication bus. A processing circuit in the programmable slave circuit is programmed to generate a low-level command(s) (e.g., a bitmap word) for controlling a coupled circuit(s) based on the high-level command(s). In this regard, it is possible to program or reprogram the processing circuit, for example via over-the-air (OTA) updates, based on the high-level command(s) to be supported, thus making it possible to flexibly customize the programmable slave circuit according to operating requirements and configurations.

18 Claims, 7 Drawing Sheets

(51) Int. Cl.
  *G06F 9/30* (2018.01)
  *H04L 12/40* (2006.01)
  *G06F 9/54* (2006.01)
  *G06F 7/575* (2006.01)

(52) U.S. Cl.
  CPC ...... *G06F 9/30032* (2013.01); *G06F 9/30043* (2013.01); *G06F 9/546* (2013.01); *G06F 13/4282* (2013.01); *H04L 12/40019* (2013.01)

(56) References Cited

U.S. PATENT DOCUMENTS

| | | | | |
|---|---|---|---|---|
| 10,198,384 | B2* | 2/2019 | Ngo | G06F 13/364 |
| 10,698,847 | B2* | 6/2020 | Ngo | G06F 13/364 |
| 11,366,665 | B2* | 6/2022 | Guan | G06F 9/30098 |
| 2015/0100763 | A1* | 4/2015 | Holm | G06F 9/30145 |
| | | | | 712/210 |
| 2015/0186144 | A1* | 7/2015 | Abdallah | G06F 9/30145 |
| | | | | 712/206 |
| 2017/0255578 | A1* | 9/2017 | Ngo | G06F 13/404 |
| 2017/0255579 | A1* | 9/2017 | Ngo | G06F 13/404 |
| 2020/0019406 | A1* | 1/2020 | Kalamatianos | G06F 9/3802 |
| 2020/0151131 | A1* | 5/2020 | Ngo | H04L 12/40 |
| 2020/0153470 | A1* | 5/2020 | Ngo | G06F 13/4027 |
| 2020/0334185 | A1* | 10/2020 | Ngo | G06F 13/4027 |

OTHER PUBLICATIONS

'MIPI RFFE v2.0 Webinar: An Overview of New Features and Implementation Benefits' by Jim Ross et al., Feb. 2015. (Year: 2015).*

'MIPI Alliance Specification for RF Front-End Control Interface' Version 1.10, Jul. 26, 2011. (Year: 2011).*

* cited by examiner

PROGRAMMABLE SLAVE CIRCUIT ON A COMMUNICATION BUS

RELATED APPLICATIONS

This application claims the benefit of U.S. provisional patent application Ser. No. 62/895,064, filed on Sep. 3, 2019, the disclosure of which is incorporated herein by reference in its entirety.

FIELD OF THE DISCLOSURE

The technology of the disclosure relates generally to a slave circuit on a communication bus that operates based on a master-slave topology.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

To provide an end user with a rich multifunctional experience, a mobile communication device can employ a variety of digital and analog circuits for enabling a host of connectivity, communication, and multimedia functions. These digital and analog circuits are often interconnected via a variety of communication buses to exchange data and control signals. Some of the communication buses, such as Peripheral Component Interconnect Express (PCIE) buses, are designed to enable high-speed interconnections. In contrast, some other communication buses, such as Inter Integrated Circuit (I2C) buses, may be more suited for low-speed interconnections.

While some of the communication buses may function as general-purpose buses for interconnecting multiple types of circuits, some others may be designed to function as specialty buses for interconnecting a specific type of circuit. One such specialty bus is a Radio Frequency Front End (RFFE) bus specifically used to control an RF subsystem that can include such analog circuits as power management integrated circuits (PMIC), power amplifiers (PA), RF filters, antenna switches, and antenna tuners.

The variety of communication buses can operate based on different topologies. Some communication buses, such as PCIE, are configured to operate based on a switching topology whereby each node in the communication bus can communicate with one another. Some other communication buses, such as RFFE, are designed to operate based on a master-slave topology whereby the communication bus is exclusively controlled by a master node and every slave node on the communication bus can only communicate with the master node. Understandably, the variety of communication buses needs to operate efficiently to render optimal user experience.

SUMMARY

Aspects disclosed in the detailed description include a programmable slave circuit on a communication bus. In a non-limiting example, the communication bus can be a radio frequency front-end (RFFE) bus operating based on a master-slave topology and the programmable slave circuit can be an RFFE slave circuit on the RFFE bus. The programmable slave circuit is configured to receive a high-level command(s) (e.g., a macro word) over the communication bus. A processing circuit in the programmable slave circuit is programmed to generate a low-level command(s) (e.g., a bitmap word) for controlling a coupled circuit(s) based on the high-level command(s). In this regard, it is possible to program or reprogram the processing circuit, for example via over-the-air (OTA) updates, based on the high-level command(s) to be supported, thus making it possible to flexibly customize the programmable slave circuit according to operating requirements and configurations.

In one aspect, a programmable slave circuit is provided. The programmable slave circuit includes a data memory circuit configured to store one or more high-level commands and one or more low-level commands. The programmable slave circuit also includes a bus interface circuit coupled to a communication bus. The bus interface circuit is configured to receive the one or more high-level commands via the communication bus. The bus interface circuit is also configured to write the one or more high-level commands into the data memory circuit. The programmable slave circuit also includes a processing circuit. The processing circuit is configured to read the one or more high-level commands from the data memory circuit. The processing circuit is also configured to generate the one or more low-level commands based on the one or more high-level commands. The processing circuit is also configured to write the one or more low-level commands into the data memory circuit.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a programmable slave circuit on a communication bus. In a non-limiting example, the communication bus can be a radio frequency front-end (RFFE) bus operating based on a master-slave topology and the programmable slave circuit can be an RFFE slave circuit on the RFFE bus. The programmable slave circuit is configured to receive a high-level command(s) (e.g., a macro word) over the communication bus. A processing circuit in the programmable slave circuit is programmed to generate a low-level command(s) (e.g., a bitmap word) for controlling a coupled circuit(s) based on the high-level command(s). In this regard, it is possible to program or reprogram the processing circuit, for example via over-the-air (OTA) updates, based on the high-level command(s) to be supported, thus making it possible to flexibly customize the programmable slave circuit according to operating requirements and configurations.

Before discussing the programmable slave circuit of the present disclosure, starting at FIG. 2, an introduction of a multi-master RFFE interface and bus structure, as defined by the MIPI® alliance specification for an RFFE control interface, version 2.1 (hereinafter "RFFE specification"), is first provided with reference to FIGS. 1A and 1B.

Figure 1A:
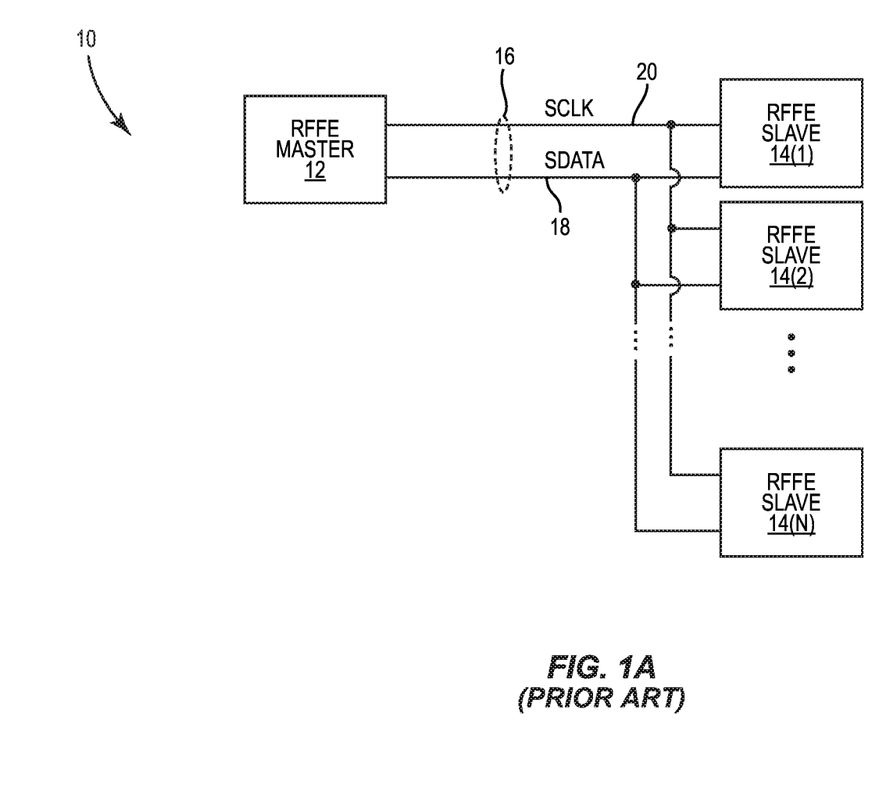
FIG. 1A is a schematic diagram of an exemplary radio frequency front-end (RFFE) bus structure as defined in the MIPI® alliance specification for an RFFE control interface, version 2.1.

In this regard, FIG. 1A is a schematic diagram of an exemplary RFFE bus structure 10 as defined in the RFFE specification. The RFFE bus structure 10 includes an RFFE master 12 coupled to a number of RFFE slaves 14(1)-14(N) over an RFFE bus 16. In this regard, the RFFE bus structure 10 is said to be based on a master-slave topology.

According to the RFFE specification, the RFFE bus 16 is a two-wire serial bus that includes a data line 18 and a clock line 20 for communicating a bidirectional data signal SDATA and a clock signal SCLK, respectively. Further according to the RFFE specification, each of the RFFE slaves 14(1)-14(N) is required to have a unique slave identification (USID) and the RFFE bus structure 10 can support fifteen (15) USIDs between hexadecimal value 0x1 and hexadecimal value 0xF (0x1-0xF). The RFFE specification further assigns hexadecimal value 0x0 to represent a broadcast slave identification (BSID) for all the RFFE slaves 14(1)-14(N). According to the RFFE specifications, each of the RFFE slaves 14(1)-14(N) is assigned one of the 15 USIDs by a system integrator. Accordingly, in the RFFE bus structure 10, it is possible to connect up to 15 RFFE slaves 14(1)-14(15) to the RFFE master 12 via the RFFE bus 16.

The RFFE specification also allows any of the 15 USIDs being used as a group slave identification (GSID) to identify an RFFE slave group. For example, the RFFE bus structure includes five RFFE slaves associated with USIDs 0x1-0x5, respectively. The RFFE slaves associated with USIDs 0x1-0x3 may be clustered into a first RFFE slave group and the RFFE slaves associated with USIDs 0x4-0x5 may be clustered into a second RFFE slave group. The first RFFE slave group and the second RFFE slave group may be assigned USIDs 0x6 and 0x7, respectively. In this regard, the USIDs 0x6 and 0x7 are now used as GSIDs to identify the first RFFE slave group and the second RFFE slave group, respectively. Notably, there will be a lesser number of USIDs available to identify the RFFE slaves 14(1)-14(N) if any of the 15 USIDs is used to represent a GSID.

The RFFE master 12 is configured to communicate with the RFFE slaves 14(1)-14(N) based on RFFE command sequences (e.g. register-write command sequence, register-read command sequence, trigger command sequence, etc.). According to the RFFE specification, only the RFFE master 12 can initiate an RFFE command sequence on the RFFE bus 16. Accordingly, the RFFE bus 16 can be referred to as a master-controlled communication bus. Hereinafter, a master-controlled communication bus refers generally to a communication bus coupling a master with multiple slaves, wherein all communications over the communication bus are initiated exclusively by the master.

Each of the RFFE command sequences can be associated with a USID, a GSID, or a BSID. When an RFFE command sequence is communicated based on a specific USID, the RFFE command sequence is addressed to a specific RFFE slave among the RFFE slaves 14(1)-14(N) that is identified by the specific USID. When an RFFE command sequence is communicated based on a specific GSID, the RFFE command sequence is addressed to respective RFFE slaves among the RFFE slaves 14(1)-14(N) associated with the specific GSID. When an RFFE command sequence is communicated based on the BSID, all of the RFFE slaves 14(1)-14(N) on the RFFE bus 16 will be able to receive the RFFE command sequence.

Figure 1B:
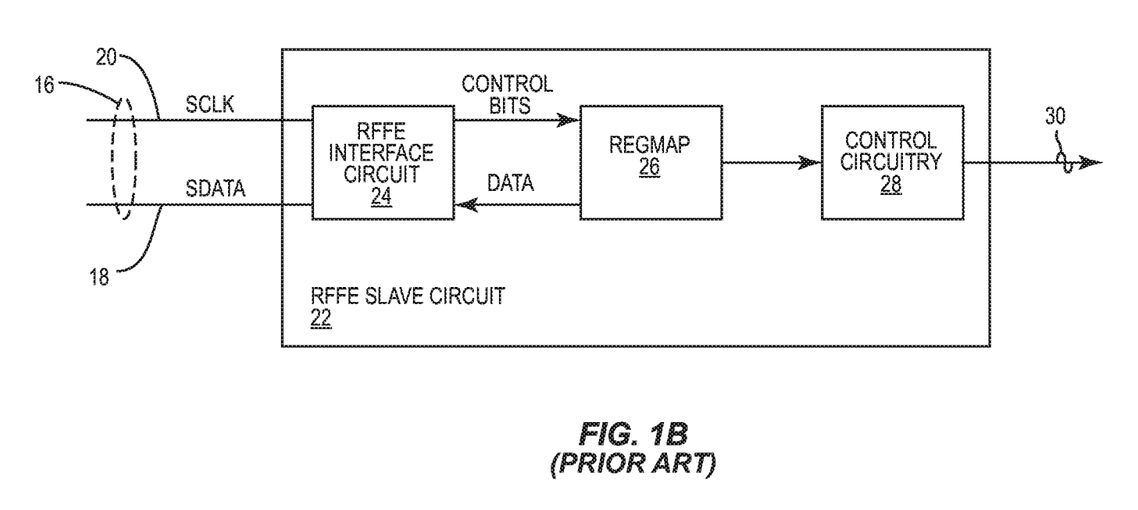
FIG. 1B is a schematic diagram providing an exemplary illustration of an RFFE slave in the RFFE bus structure of FIG. 1A.

FIG. 1B is a schematic diagram of an exemplary RFFE slave circuit 22, which can be any of the RFFE slaves 14(1)-14(N) in the RFFE bus structure 10 of FIG. 1A. Common elements between FIGS. 1A and 1B are shown therein with common element numbers and will not be re-described herein.

The RFFE slave circuit 22 includes an RFFE interface circuit 24, a register map 26 (denoted as "REGMAP"), and control circuitry 28. The register map 26 may include a number of 8-bit registers (e.g., register 0-18). The RFFE interface circuit 24 is coupled to the RFFE bus 16 to receive the RFFE command sequences from the RFFE master 12 in FIG. 1A. For example, when the RFFE interface circuit 24 receives an RFFE register-write command sequence, the RFFE interface circuit 24 writes a number of control bits into one or more registers in the register map 26. The control bits written into the register map 26 trigger the control circuitry 28 to generate a control signal 30 to control specific functions in, for example, a coupled analog circuit(s). When the RFFE interface circuit 24 receives an RFFE register-read command sequence, the RFFE interface circuit 24 reads data from the register map 26 and provides the data to the RFFE master 12. In this regard, the RFFE master 12 has all the intelligence while the RFFE slave 22 is simply functioning as a dumb terminal.

Notably, each register in the register map 26 contains a bitmap, wherein each bit in the bitmap can trigger a specific function in the coupled analog circuit(s). In this regard, the RFFE master 12 needs to write each individual bit into the register map 26 to trigger different functions in the coupled analog circuits. As such, it may be desirable to provide a certain level of intelligence in the RFFE slave 22 to help improve operating efficiency of the RFFE bus structure 10.

Figure 2:
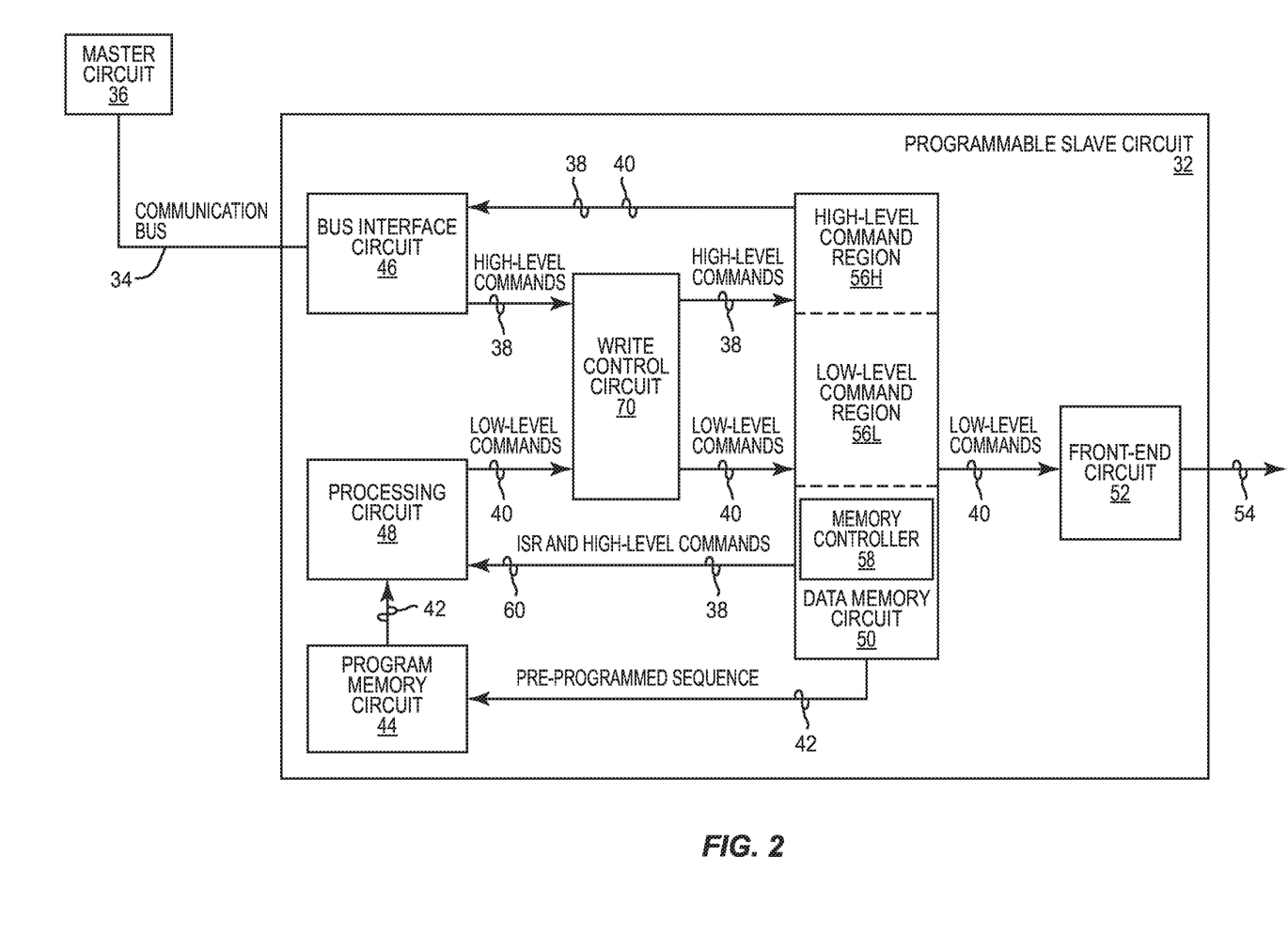
FIG. 2 is a schematic diagram of an exemplary programmable slave circuit that can be flexibly programmed or reprogrammed according to an embodiment of the present disclosure to operate as an intelligent slave on a communication bus.

In this regard, FIG. 2 is a schematic diagram of an exemplary programmable slave circuit 32 that can be flexibly programmed or reprogrammed according to an embodiment of the present disclosure to operate as an intelligent slave on a communication bus 34. In a non-limiting example, the programmable slave circuit 32 is coupled to a master circuit 36 via the communication bus 34 according to a similar master-slave topology as shown in the RFFE bus structure 10 of FIG. 1A. The master circuit 36 is configured to initialize all communications over the communication bus 34. As such, the communication bus 34 can be a master-controlled communication bus.

In contrast to any of the RFFE slaves 14(1)-14(N) in FIG. 1A, which are configured to operate as dumb terminals to the RFFE master 12, the programmable slave circuit 32 is provided with built-in intelligence to carry out specific actions despite that the master circuit 36 remains in total control over the communication bus 34. Specifically, the programmable slave circuit 32 receives one or more high-level commands 38 over the communication bus 34 and generates one or more low-level commands 40 based on the high-level commands 38. In a non-limiting example, the high-level commands 38 can be macro words and the low-level commands 40 can be bitmap words. Herein, a macro word refers to an action or a set of actions that may be performed repeatedly and a bitmap word refers to a multi-bit digital word (e.g., 8-bit) wherein each bit can trigger a specific function in a coupled circuit(s). In this regard, the master circuit 36 only needs to provide the high-level commands 38 over the communication bus 34 instead of having to program each bitmap word as in the RFFE bus structure 10 of FIGS. 1A and 1B. As a result, it is possible to improve efficiency of the communication bus 34.

In embodiments disclosed herein, the programmable slave circuit 32 can generate the low-level commands 40 for a respective one of the high-level commands 38 by executing one or more pre-programmed sequences 42 corresponding to the respective one of the high-level commands 38. Each of the pre-programmed sequences 42 includes a microcode (μCode) operation. Herein, a μCode operation refers to a set of hardware-level instruction(s) that implement higher-level machine code instructions or internal state machine sequencing. In a non-limiting example, a hardware-level instruction can include an operation code (opcode), a source field(s), and a destination field(s). The opcode may include LOAD, STORE, ADD, SUBTRACT, OR, AND, EXOR, SHIFT, JUMP, MOVE, and so on.

The programmable slave circuit 32 can include a program memory circuit 44, which can be any suitable type of memory such as read-only memory (ROM), random-access memory (RAM), and multi-time programmable (MTP) memory, as an example, configured to store the pre-programmed sequences 42. The pre-programmed sequences 42 stored in the program memory circuit 44 can be programmed or reprogrammed via, for example over-the-air (OTA) updates, based on the high-level commands 38 to be supported in the programmable slave circuit 32. As such, it is possible to flexibly customize the programmable slave circuit 32 according to specific operating requirements and configurations. As a result, the programmable slave circuit 32 can become more intelligent under the control of the master circuit 36.

In a non-limiting example, the programmable slave circuit 32 includes a bus interface circuit 46, a processing circuit 48, and a data memory circuit 50. The bus interface circuit 46 is coupled to the communication bus 34. The bus interface circuit 46 receives the high-level commands 38 from the master circuit 36 and writes the high-level commands 38 into the data memory circuit 50. The processing circuit 48 reads the high-level commands 38 from the data memory circuit 50. Accordingly, the processing circuit 48 generates the low-level commands 40 based on the high-level commands 38 and writes the low-level commands 40 to the data memory circuit 50. The programmable slave circuit 32 may further include a front-end circuit 52 coupled to the data memory circuit 50. The front-end circuit 52 may be configured to generate a control signal 54 based on the low-level commands 40 for controlling a coupled circuit(s), such as an analog circuit(s).

Figure 3:
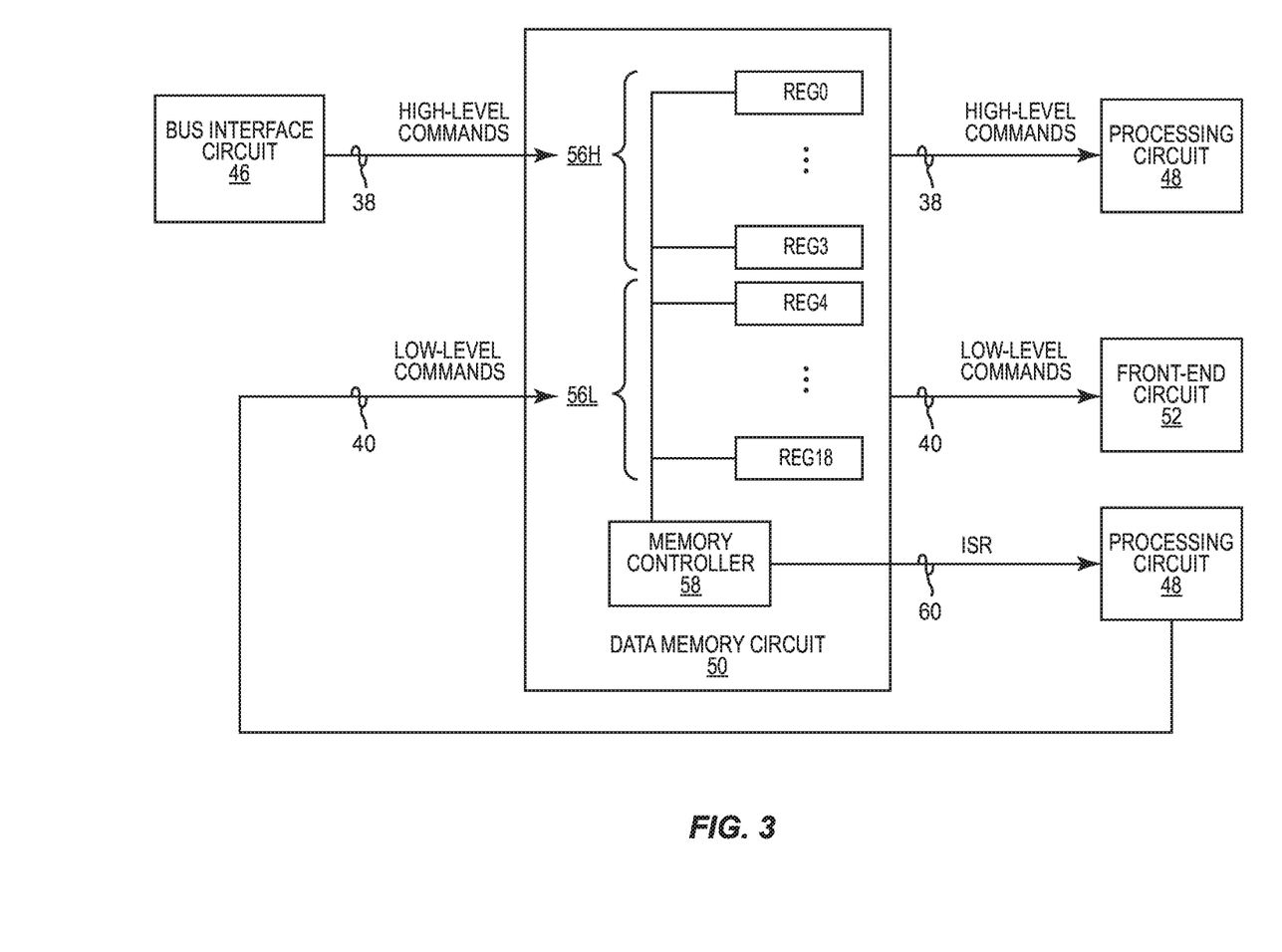
FIG. 3 is a schematic diagram of an exemplary data memory circuit in the programmable slave circuit of FIG. 2.

The data memory circuit 50 may be partitioned into a high-level command region 56H and a low-level command region 56L for storing the high-level commands 38 and the low-level commands 40, respectively. FIG. 3 is a schematic diagram providing an exemplary illustration of the data memory circuit 50 in the programmable slave circuit 32 of FIG. 2. Common elements between FIGS. 2 and 3 are shown therein with common element numbers and will not be re-described herein.

In a non-limiting example, the program memory circuit 44 can be programmed or reprogrammed by putting the programmable slave circuit 32 in a programming mode. In one embodiment, the bus interface circuit 46 can receive the pre-programmed sequences 42 (e.g., in a bootloader or a configuration file) via the communication bus 34. As an example, the bus interface circuit 46 may write the pre-programmed sequences 42 into the high-level command region 56H. Accordingly, a memory controller 58 may write the pre-programmed sequences 42 into the program memory circuit 44. The memory controller 58 may cause the programmable slave circuit 32 to exit the programming mode upon completion of writing the pre-programmed sequences 42 to the program memory circuit 44.

In a non-limiting example, the data memory circuit 50 includes a set of registers Reg0-Reg18. In this example, the high-level command region 56H includes registers Reg0-Reg3 and the low-level command region 56L includes registers Reg4-Reg18. The data memory circuit 50 includes the memory controller 58 coupled to the registers Reg0-Reg18. The memory controller 58 can be configured to cause the high-level commands 38 and the low-level commands 40 to be written into the high-level command region 56H and the low-level command region 56L, respectively.

The memory controller 58 may be configured to impose access restrictions on the bus interface circuit 46 and the processing circuit 48. In one embodiment, the memory controller 58 can make the high-level command region 56H exclusively accessible by the bus interface circuit 46 and the low-level command region 56L exclusively accessible by the processing circuit 48. In this regard, the bus interface circuit 46 can only write to the high-level command region 56H and the processing circuit can only write to the low-level command region 56L. In the meantime, the memory controller 58 may allow both the bus interface circuit 46 and the processing circuit 48 to read from any of the high-level command region 56H and the low-level command region 56L. In an alternative embodiment, the memory controller 58 may allow the bus interface circuit 46 and/or the processing circuit 48 to write to both the high-level command region 56H and the low-level command region 56L. However, the bus interface circuit 46 may be configured to refrain from writing to the low-level command region 56L and the processing circuit 48 may be configured to refrain from writing to the high-level command region 56H.

Whenever a newly arrived high-level command 38 is written into the high-level command region 56H, the memory controller 58 may generate one or more interrupt service routines (ISRs) 60 accordingly. The memory controller 58 may provide the ISRs 60, along with the newly arrived high-level command 38, to the processing circuit 48. The ISRs 60 can cause the processing circuit 48 to generate corresponding low-level commands 40 based on the newly arrived high-level command 38. In response to receiving the ISRs 60, the processing circuit 48 retrieves and executes a respective one of the pre-programmed sequences 42 from the program memory circuit to generate the low-level commands 40 corresponding to the newly arrived high-level command 38.

Figure 4:
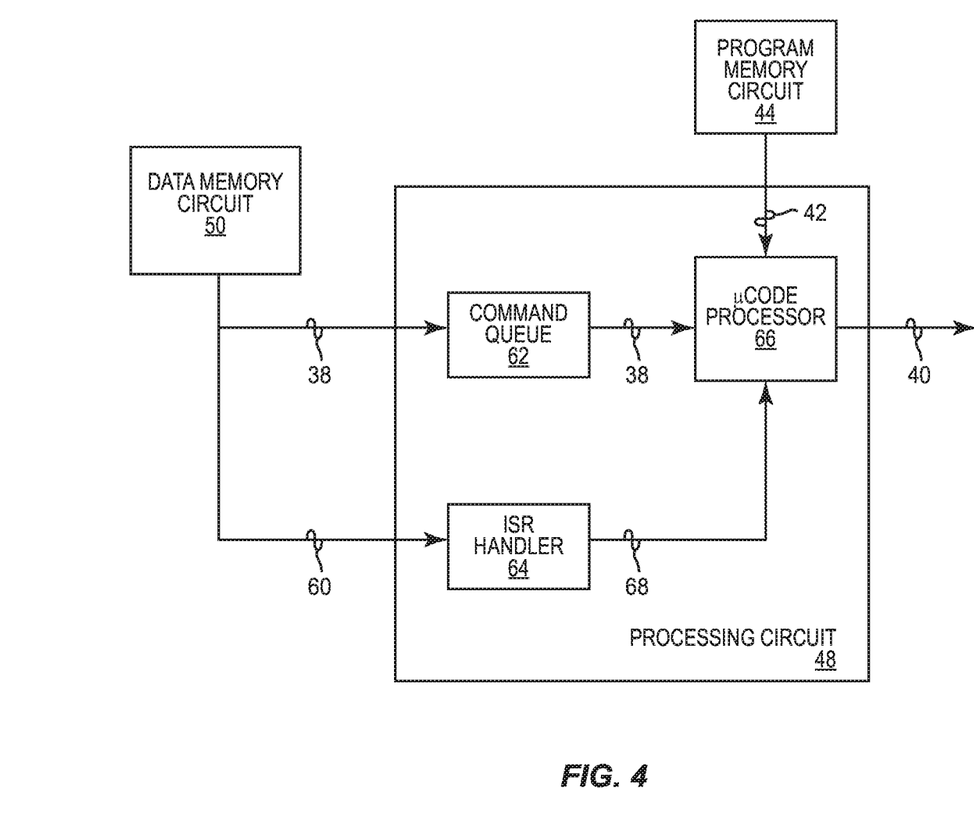
FIG. 4 is a schematic diagram of an exemplary processing circuit in the programmable slave circuit of FIG. 2.

FIG. 4 is a schematic diagram providing an exemplary illustration of the processing circuit 48 in the programmable slave circuit 32. Common elements between FIGS. 2 and 4 are shown therein with common element numbers and will not be re-described herein.

In a non-limiting example, the processing circuit 48 includes a command queue 62, an ISR handler 64, and a μCode processor 66. The command queue 62, which can be a first-in first out (FIFO) queue or a last-in first-out (LIFO) queue, as an example, is configured to store the newly arrived high-level command 38 received from the data memory circuit 50. The ISR handler 64 is configured to receive the ISRs 60 from the data memory circuit 50 and provides a trigger signal 68 to the μCode processor 66. Notably, the ISR handler 64 may receive more than one of the ISRs 60 concurrently. As such, the ISR handler 64 may be configured to prioritize the ISRs 60 and generates the trigger signal 68 accordingly.

The μCode processor 66 is different from a conventional microprocessor in that the μCode processor 66 does not require a compiler or interpreter, executes in a single thread, and without automatic overflow detection. In a non-limiting example, the μCode processor 66 can be implemented by or contain an arithmetic logic unit (ALU). In response to receiving the trigger signal 68 and the newly arrived high-level command 38, the μCode processor 66 retrieves the pre-programmed sequences 42 corresponding to the newly arrived high-level command 38 and executes the pre-programmed sequences 42 to generate the low-level commands 40.

Figure 5:
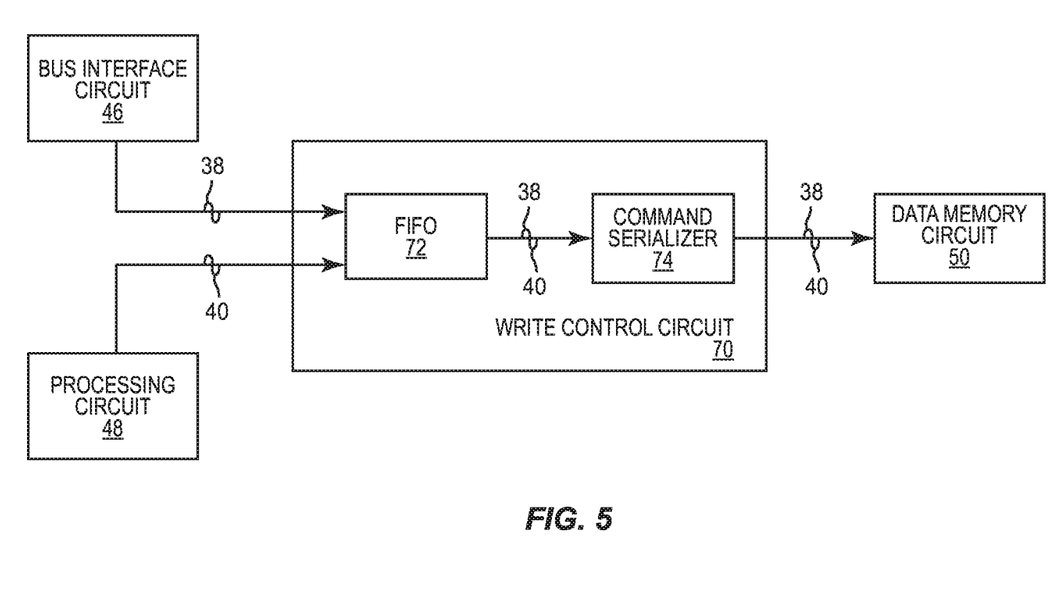
FIG. 5 is a schematic diagram of an exemplary write control circuit in the programmable slave circuit of FIG. 2.

With reference back to FIG. 2, understandably, the bus interface circuit 46 may attempt to write the high-level commands 38 into the data memory circuit 50 concurrent to an attempt by the processing circuit 48 to write the low-level commands 40 to the data memory circuit 50. To help prevent potential conflict, the programmable slave circuit 32 can further include a write control circuit 70 configured to serialize the high-level commands 38 and the low-level commands 40 before writing into the data memory circuit 50. In this regard, FIG. 5 is a schematic diagram providing an exemplary illustration of the write control circuit 70 in the programmable slave circuit 32 of FIG. 2. Common elements between FIGS. 2 and 5 are shown therein with common element numbers and will not be re-described herein.

In a non-limiting example, the write control circuit 70 includes a FIFO queue 72 and a command serializer 74. The FIFO queue 72 is configured to store all the high-level commands 38 and the low-level commands 40 to prevent any of the high-level commands 38 and the low-level commands 40 from being lost. As the command serializer 74 only reads from a top of the FIFO queue 72 (e.g., per clock cycle), it is possible to ensure that only one of the high-level commands 38 and the low-level commands 40 is written to the data memory circuit 50 at any given time.

The write control circuit 70 may be configured to write the high-level commands 38 and the low-level commands 40 into the data memory circuit 50 with identical or different write latencies. In a non-limiting example, the write control circuit 70 is configured to write the low-level commands 40 with a lower write latency than writing the high-level commands 38. Notably, writing the low-level commands 38 with lower write latency may allow the programmable slave circuit 32 to meet certain real time operation requirements.

With reference back to FIG. 2, the programmable slave circuit 32 is configured based on a modular configuration with well-configured interfaces, whereby each of the circuits can be agnostic to how other circuits function. For example, the data memory circuit 50 can be agnostic to how the bus interface circuit 46 communicates with the master circuit 36 and any specific type of the communication bus 34. Similarly, given the ability to program and reprogram the program memory circuit 44 via OTA updates, the processing circuit 48 can also be agnostic to the type of the communication bus 34. Such modular configuration makes it possible to adapt the programmable slave circuit 32 to operate with a variety of communication buses. For example, the communication bus 34 can be a MIPI RFFE$^{SM}$ bus, a MIPI SoundWire® bus, an Inter-Integrated Circuit (I²C) bus, or any other type of communication buses configured to operate based on a master-slave topology.

Figure 6:
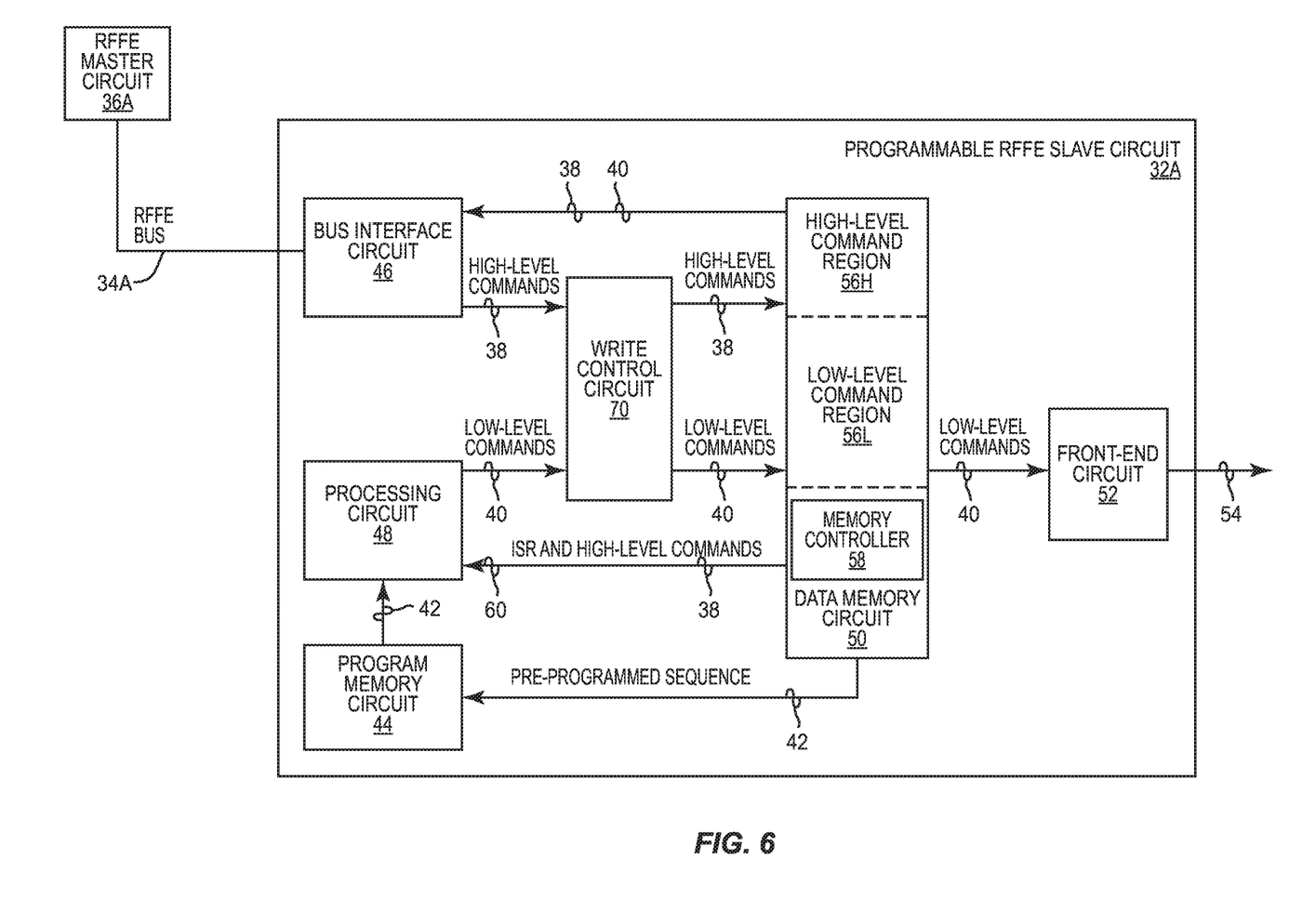
FIG. 6 is a schematic diagram of an exemplary programmable RFFE slave circuit configured to communicate with an RFFE master circuit over an RFFE bus.

In this regard, FIG. 6 is a schematic diagram of an exemplary programmable RFFE slave circuit 32A configured to communicate with an RFFE master circuit 36A over an RFFE bus 34A. Common elements between FIGS. 2 and 6 are shown therein with common element numbers and will not be re-described herein.

The bus interface circuit 46 can be configured to receive the high-level commands 38 from the RFFE master circuit 36A via the RFFE bus 34A. The processing circuit 48 can be configured to generate the low-level commands 40 for controlling such analog circuits as power amplifiers, RF filters, antenna switches, and so on.

In a non-limiting example, each of the high-level commands 38 received from the RFFE master circuit 36A can include a macro word configured according to a predefined macro format. For example, the macro word can be an 8-bit digital word so divided to have a 2-bit power mode selector, a 3-bit modulation range selector, and a 3-bit filter notch selector. Each of the low-level commands 40, on the other hand, can be an RFFE bitmap word conforming to a pre-defined RFFE format per the RFFE specification.

As discussed above, the write control circuit 70 may write the low-level commands 40 into the data memory circuit 50 with lower write latency. In this regard, the programmable RFFE slave circuit 32A is able to meet the real time operation requirement of RFFE, especially when the programmable RFFE slave circuit 32A operates in accordance to a "bit banged" programming model.

Those skilled in the art will recognize improvements and modifications to the embodiments of the present disclosure. All such improvements and modifications are considered within the scope of the concepts disclosed herein and the claims that follow.

What is claimed is:

1. A programmable slave circuit comprising:
a program memory circuit configured to store one or more pre-programmed sequences each corresponding to a respective one of one or more high-level commands;
a data memory circuit configured to store the one or more high-level commands and one or more low-level commands;
a bus interface circuit coupled to a wired communication bus and configured to:
receive the one or more pre-programmed sequences via the wired communication bus;
cause the one or more pre-programmed sequences to be written into the program memory circuit;
receive the one or more high-level commands via the wired communication bus; and
write the one or more high-level commands into the data memory circuit; and
a processing circuit configured to:
read the one or more high-level commands from the data memory circuit;
generate the one or more low-level commands based on the one or more high-level commands; and
write the one or more low-level commands into the data memory circuit.

2. The programmable slave circuit of claim 1 wherein each of the one or more pre-programmed sequences comprises a microcode operation corresponding to at least one operation code (opcode) selected from the group consisting of: LOAD, STORE, ADD, SUBTRACT, OR, AND, EXOR, SHIFT, JUMP, and MOVE.

3. The programmable slave circuit of claim 1 wherein the processing circuit is further configured to:
read the one or more high-level commands from the data memory circuit; and
execute a respective one of the one or more pre-programmed sequences corresponding to each of the one or more high-level commands to generate the one or more low-level commands.

4. The programmable slave circuit of claim 3 wherein the processing circuit comprises:
a command queue coupled to the data memory circuit and configured to store the respective one of the one or more pre-programmed sequences corresponding to each of the one or more high-level commands; and
a microcode processor configured to execute the respective one of the one or more pre-programmed sequences corresponding to each of the one or more high-level commands to generate the one or more low-level commands.

5. The programmable slave circuit of claim 4 wherein the microcode processor comprises an arithmetic logic unit (ALU).

6. The programmable slave circuit of claim 3 wherein the processing circuit is further configured to:
read the one or more high-level commands from the data memory circuit in response to receiving one or more interrupt service routings (ISRs) from the data memory circuit; and
execute a respective one of the one or more pre-programmed sequences corresponding to each of the one or more high-level commands to generate the one or more low-level commands.

7. The programmable slave circuit of claim 6 wherein the processing circuit is further configured to prioritize the one or more ISRs.

8. The programmable slave circuit of claim 6 wherein the data memory circuit comprises a memory controller configured to generate the ISR in response to any of the one or more high-level commands being written into the data memory circuit.

9. The programmable slave circuit of claim 8 wherein the data memory circuit further comprises:
a high-level command region configured to store the one or more high-level commands; and
a low-level command region configured to store the one or more low-level commands.

10. The programmable slave circuit of claim 9 wherein the high-level command region and the low-level command region each comprises a respective set of registers.

11. The programmable slave circuit of claim 9 wherein the bus interface circuit is further configured to read the one or more high-level commands and the one or more low-level commands.

12. The programmable slave circuit of claim 9 wherein the bus interface circuit and the processing circuit are each configured to write to both the high-level command region and the low-level command region.

13. The programmable slave circuit of claim 9 wherein:
the bus interface circuit is configured to write exclusively to the high-level command region; and
the processing circuit is configured to write exclusively to the low-level command region.

14. The programmable slave circuit of claim 1 further comprising a write control circuit configured to:
receive the one or more high-level commands from the bus interface circuit;
receive the one or more low-level commands from the processing circuit; and
write the one or more high-level commands and the one or more low-level commands into the data memory circuit sequentially.

15. The programmable slave circuit of claim 14 wherein the write control circuit comprises:
a first-in first-out (FIFO) queue configured to store the one or more high-level commands and the one or more low-level commands; and
a command serializer configured to:
read one of the one or more high-level commands and the one or more low-level commands from the FIFO queue; and
write the one of the one or more high-level commands and the one or more low-level commands into the data memory circuit.

16. The programmable slave circuit of claim 1 further comprising a front-end circuit coupled to the data memory circuit and configured to control one or more coupled circuits based on the one or more low-level commands.

17. The programmable slave circuit of claim 1 wherein:
the wired communication bus comprises a radio frequency front-end (RFFE) bus; and
the bus interface circuit is coupled to an RFFE master via the RFFE bus.

18. The programmable slave circuit of claim 17 wherein:
the one or more high-level commands each comprises a macro word configured according to a predefined macro format; and
the one or more low-level commands each comprises an RFFE bitmap word conforming to a predefined RFFE format.

* * * * *